United States Patent
Park et al.

(10) Patent No.: US 7,310,603 B2
(45) Date of Patent: Dec. 18, 2007

(54) VOICE CONTROL APPARATUS OF VACUUM CLEANER AND METHOD THEREOF

(75) Inventors: Sung-Il Park, Gyeonggi (KR); Chan-Hee Hong, Seoul (KR); Seong-Bin Lee, Gyeonggi (KR); Hee-Suk Roh, Gyeonggi (KR); Anatoli Tikhotski, Petersburg (RU); Victor Redkov, Petersburg (RU); Mikhail Sall, Petersburg (RU); Andrei Viktorov, Petersburg (RU); Alexandr Maiboroda, Petersburg (RU); Valery Chernenko, Petersburg (RU)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 10/304,865

(22) Filed: Nov. 27, 2002

(65) Prior Publication Data

US 2004/0034533 A1 Feb. 19, 2004

(30) Foreign Application Priority Data

Aug. 2, 2002 (KR) ...................... 10-2002-0045865

(51) Int. Cl.
*G10L 11/00* (2006.01)
*A47L 5/00* (2006.01)

(52) U.S. Cl. ...................... 704/270; 704/272; 15/300.1

(58) Field of Classification Search ...................... None
See application file for complete search history.

(56) References Cited

U.S. PATENT DOCUMENTS

| | | | |
|---|---|---|---|
| 4,401,852 A * | 8/1983 | Noso et al. .................. 367/198 |
| 4,506,378 A * | 3/1985 | Noso et al. .................. 704/275 |
| 4,827,520 A * | 5/1989 | Zeinstra .......................... 701/1 |
| 5,247,705 A * | 9/1993 | Attig et al. ..................... 455/74 |
| 5,345,538 A * | 9/1994 | Narayannan et al. ....... 704/275 |
| 5,832,440 A * | 11/1998 | Woodbridge et al. ....... 704/275 |
| 6,380,852 B1 * | 4/2002 | Hartman et al. ............. 340/521 |

FOREIGN PATENT DOCUMENTS

| | | | | |
|---|---|---|---|---|
| JP | 57-184999 | | 11/1982 | |
| JP | 404105630 A | * | 8/1990 | .................. 15/326 |

(Continued)

OTHER PUBLICATIONS

English Language Abstract of JP 4-183425.
English Language Abstract of JP 57-184999.
English Language Abstract of JP 2000-305589.
English Language Abstract of JP 10-301592.

*Primary Examiner*—David Hudspeth
*Assistant Examiner*—Brian L. Albertalli
(74) *Attorney, Agent, or Firm*—Greenblum & Bernstein, P.L.C.

(57) ABSTRACT

A voice control apparatus of a vacuum cleaner includes: a sense signal detector for detecting a sense signal provided from a user to provide a voice recognizable environment in an ambience; a voice command recognizing unit for temporarily stopping a driving of a motor upon receiving the detected sense signal and, at the same time, outputting a voice command control signal previously set in a voice command set corresponding to a voice command instructed by the user; and a driving command controller for controlling a function and a mode of a vacuum cleaner upon receiving the voice command control signal. By providing a voice recognizable environment, the vacuum cleaner can be effectively controlled through a user's voice command even in an environment with a strong noise.

26 Claims, 2 Drawing Sheets

FOREIGN PATENT DOCUMENTS

| | | |
|---|---|---|
| JP | 4-183425 | 6/1992 |
| JP | 10-301592 | 11/1998 |
| JP | 2000-305589 | 11/2000 |
| WO | 01/37060 | 5/2001 |

\* cited by examiner

| FORM | EXAMPLE |
|---|---|
| CONTROL SENTENCE FOR INSTRUCTING OPERATION,MOVEMENT,ROTATION AND STOPPAGE OF MOTOR | STARTING,STOPPING.... |
| NUMERICAL SOUND FOR CONTROLLING DRIVING OF MOTOR | STRONG,WEAK,ONE,TWO, THREE,.... |
| COMMAND SENTENCE SHOWING OPERATION STATE OF VACUUM CLEANER | OPERATION TIME DISPLAY,.... |
| ⋮ | ⋮ |

VOICE CONTROL APPARATUS OF VACUUM CLEANER AND METHOD THEREOF

BACKGROUND OF THE INVENTION

1. Field of the Invention

The present invention relates to a voice control of a vacuum cleaner and, more particularly, to a voice control apparatus and method of a vacuum cleaner that are capable of effectively controlling a vacuum cleaner through a voice command from ambience.

2. Description of the Background Art

In general, a vacuum cleaner makes the inside of a main body to a high vacuum state by forcibly circulating air inside a mechanism according to a rotation of a motor. Accordingly, the vacuum cleaner sucks dust or contaminant together with air through a suction hole by using a strong air volume generated owing to high pressure difference between the ambience and the inside of the main body, thereby performing cleaning.

A general vacuum cleaner includes: a suction hole for sucking dust or contaminant, a motor, a rotating blade for making the inside of the device to a vacuum state, a filter for filtering dust or contaminant, dust collecting case and an exhaust hole for discharge sucked air.

The operation of the vacuum cleaner constructed as described above in accordance with the conventional art will now be explained.

In the vacuum cleaner, the blade connected to the internal motor is quickly rotated to vacuumize the inside of the cleaner and dust or contaminant is sucked through the suction hole together with air. At this time, the dust sucked through the suction hole is filtered by the filter and the sucked air is discharged to the exhaust hole, thereby performing a cleaning.

Recently, besides the vacuum cleaning, a cleaner that can perform a damp cloth cleaning is also fabricated, and is advancing to have a variety of functions.

For example the vacuum cleaner can be driven or perform an operation by itself in a fully automatic mode, can be driven or perform an operation by using a device such as a remote controller in a remote control mode, or can perform a cleaning operation or be controlled in a manual control mode.

Especially, a recent vacuum cleaner adopts a special sensor to recognize an ambience to add a function of a free movement and an obstacle avoiding, thereby providing a convenient working environment to users.

In addition, by adding a voice recognition function in controlling of the vacuum cleaner, the cleaning operation can be performed more conveniently, and at the same time, a user can be free in using hands or for a level of vision.

FIG. 1 is a block diagram of a voice control apparatus of a vacuum cleaner in accordance with a conventional art.

As shown in FIG. 1, the vacuum cleaner receives a voice command through a device such as a microphone and provides it to an input signal detector 11. The input signal detector 11 compares the inputted voice command with a preset voice command, and outputs a driving control signal corresponding to the voice command of a user to a driving controller 13.

In response to the driving control signal, the driving controller 13 outputs a motor drive control signal to a motor driving unit 15 to control an operation of the vacuum cleaner.

However, the voice controlling of the vacuum cleaner in accordance with the conventional vacuum cleaner has the following problems.

That is, in the voice controlling of the conventional vacuum cleaner, a voice command is hardly recognized due to the strong noise generated from the vacuum cleaner itself.

That is, the vacuum cleaner performs an operation through suction of air of water and due to a variety of noises generated from the vacuum cleaner itself, several phonemes instructed by the user are much damaged, causing a great problem in recognizing a voice command. In addition, the strong noise makes it hard to recognize the voice command according to a distance between the user and a receiving unit for receiving the voice command of the user or positions of the user and the vacuum cleaner.

Moreover, in order to implement a voice recognition algorithm to discriminate and process various noises and voices in an environment of the strong noise, a large amount of data needs to be processed. This result in a necessity of a high performance microcomputer for processing the data, and thus, increase in an expense.

SUMMARY OF THE INVENTION

Therefore, an object of the present invention is to provide a voice control method and apparatus of a vacuum cleaner that is capable of effectively controlling a vacuum cleaner through a voice command by providing a voice recognizable environment to effectively perform a voice command of a user in an environment with a strong noise.

To achieve these and other advantages and in accordance with the purpose of the present invention, as embodied and broadly described herein, there is provided a voice control apparatus of a vacuum cleaner including: a sense signal detector for detecting a sense signal provided from a user to provide a voice recognizable environment in an ambience; a voice command recognizing unit for temporarily stopping a driving of a motor upon receiving the detected sense signal and, at the same time, outputting a voice command control signal previously set in a voice command set corresponding to a voice command instructed by the user; and a driving command controller for controlling a function and a mode of a vacuum cleaner upon receiving the voice command control signal.

To achieve the above objects, there is also provided a voice control method of a vacuum cleaner in which a sense signal for providing a voice recognizable environment is received to temporarily stop driving of a motor, and at the same time, a voice command control signal corresponding to a voice command of a user is outputted to control a function and a mode of a vacuum cleaner.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
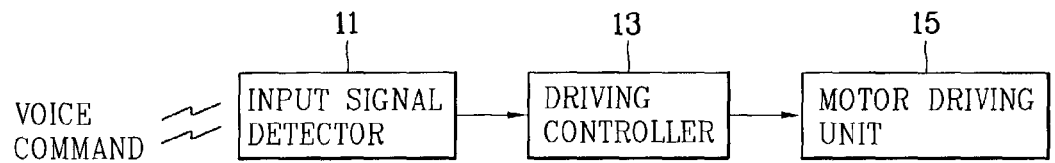
FIG. 1 is a block diagram of a voice control apparatus of a vacuum cleaner in accordance with a conventional art.
Figure 2A:
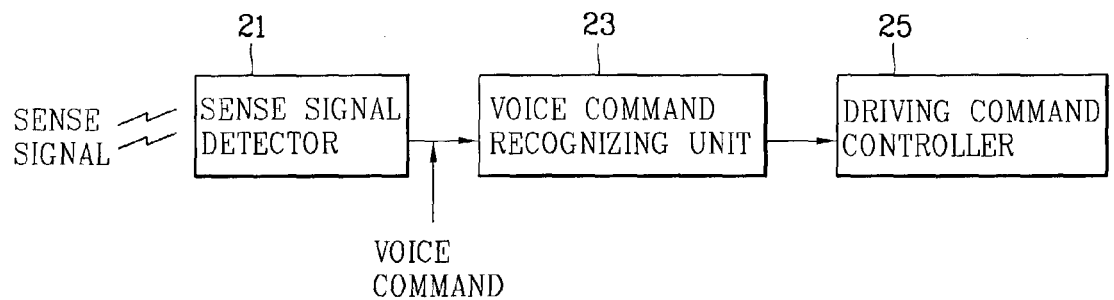
FIGS. 2A and 2B are a block diagram of a voice control apparatus of a vacuum cleaner in accordance with the present invention.
Figure 2B:
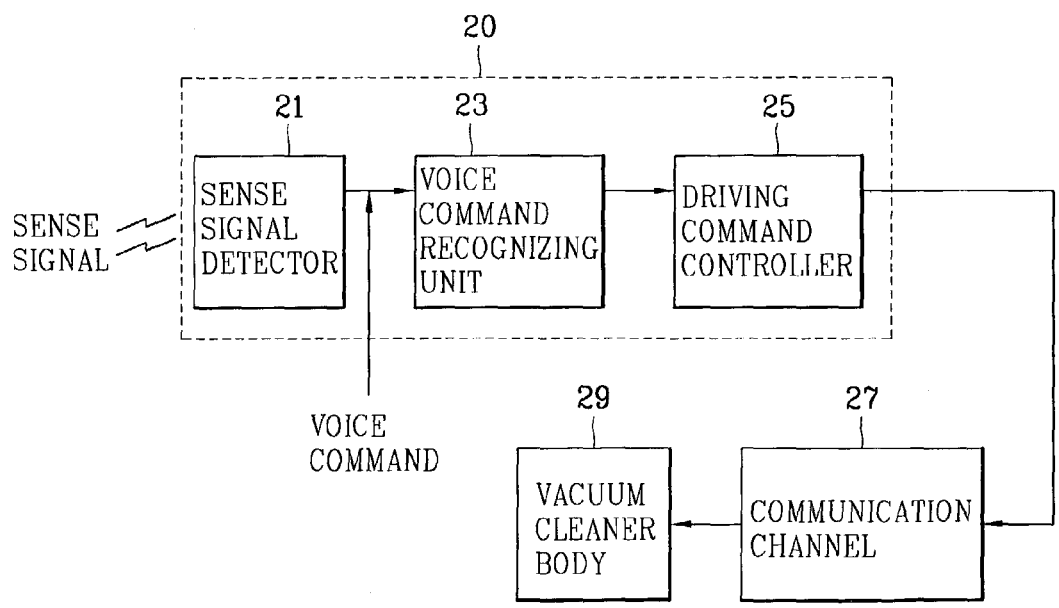

FIGS. 2A and 2B are a block diagram of a voice control apparatus of a vacuum cleaner in accordance with the present invention.

As shown in FIG. 2A, a voice control apparatus of a vacuum cleaner includes a sense signal detector 21 for detecting a sense signal provided from a user to provide a voice recognizable environment from an ambience; a voice command recognizing unit 23 for temporarily stopping a driving of a motor upon receiving the detected sense signal and, at the same time, outputting a voice command control signal previously set in a voice command set corresponding to a voice command instructed by the user; and a driving command controller 25 for controlling a function and a mode of a vacuum cleaner upon receiving the voice command control signal. In the embodiment of the present invention, all elements for vacuum cleaning are constructed in one body of the cleaner.

However, as shown in FIG. 2B, in case that the body 29 of the vacuum cleaner and the docking station 20 are separately constructed a communication channel 27 which uses a wired or wireless communication means for outputting a voice command control signal should be additionally included in the body 29 of the vacuum cleaner.

The voice command recognizing unit includes a voice recognizer for discriminating a voice command given by a user, an encoder unit for coding each voice command as discriminated and outputting it, and a decoder unit for decoding a data frame coded by the encoder unit and outputting it.

The operation of the vacuum cleaner constructed as described above will now be explained.

First, the vacuum cleaner is operated in one of a fully automatic mode, a remote control mode and a manual control mode.

The sense signal detector 21 detects a sense signal provided from a user, and the voice command recognizing unit 23 temporarily stops a driving of the motor upon receiving the detected sense signal and, at the same time, turns on a switch for a voice recognition, thereby providing an environment that a voice command instructed by the user can be received.

At this time, when the voice command recognizing unit 23 receives the voice command for controlling the vacuum cleaner from the user, it discriminates the voice command of the user and outputs a corresponding voice command control signal to control the motor.

This will now be described in detail.

The sense signal detector 21 detects the sense signal for providing a voice recognizable environment in a noise-strong environment.

The sense signal is a voice signal obtained by receiving a sound of ambience through a microphone and separating a voice signal therefrom or selectively canceling a noise from the ambient sound.

At this time, the sense signal detector 21 uses a nickname, a simply defined command form, in order to heighten a voice recognition rate. That is, a voice source of the user is learned previously for a predetermined time by using a nickname and stored in the detector, so that the nickname value and the sense signal value provided for a voice recognition are compared to detect an accurate voice signal.

In case that a voice is hardly recognized due to a strong noise, the sense signal is a contact signal detected by a tactile sensor attached at a certain portion of the body of the vacuum cleaner, or at a certain portion of the docking station separated from the body of the vacuum cleaner.

The sense signal is an infrared ray signal detected by an infrared remote controller receiving unit by operating an infrared remote controller directly by the user.

Thereafter, the voice command recognizing unit 23 receives the detected sense signal to temporarily stop the driving of the motor and, at the same time, turns on the switch for the voice recognition, thereby providing an environment that the voice command instructed by the user can be received.

Figures 3, 4:
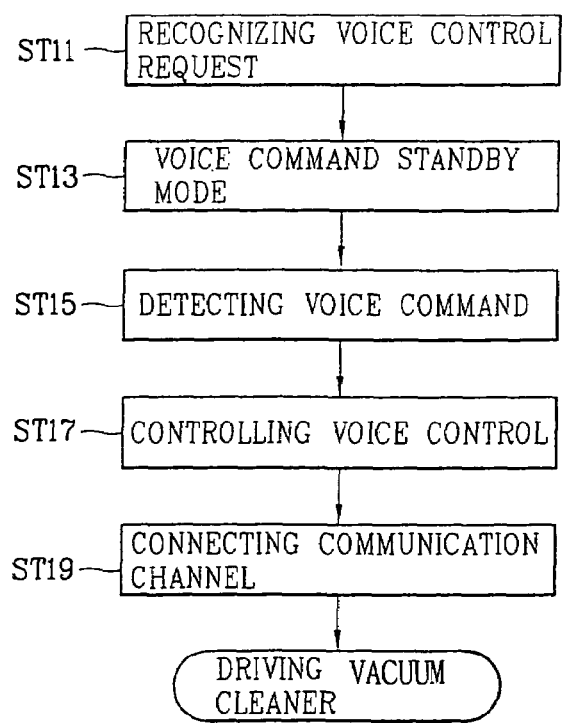
FIG. 3 is an exemplary view showing voice data provided to a voice command set in accordance with the present invention.
FIG. 4 is a flow chart of a voice control method of a vacuum cleaner in accordance with the present invention.

At this time, when the user instructs a voice command, the voice command control signal pre-set in the voice command set as shown in FIG. 3 is outputted corresponding to the voice command.

That is, in the voice command recognizing unit 23, the voice recognizer discriminates the voice command given by the user, codes each voice command and outputs it, the encoder unit transmits the coded data frame to the decoder unit, and the decoder unit decodes the coded data outputted from the encoding unit, so that the voice command control signal is outputted to the driving command controller 25.

FIG. 3 is an exemplary view showing voice data provided to a voice command set in accordance with the present invention.

As shown in FIG. 3, the voice command set includes a control sentence for instructing operation, movement, rotation and stoppage of the motor of the vacuum cleaner; a numerical sound for controlling a strong, medium and weak driving force of the motor, and a command sentence for controlling a display window showing an operation state of the vacuum cleaner. The control sentence, the numerical sound and the command sentence stored in the voice command set are learned by the user for a predetermined time and stored.

Thereafter, by having a microcomputer for controlling a function and a mode of the vacuum cleaner, the driving command controller 25 receives the voice command control signal and drives the vacuum cleaner under the control of the microcomputer.

FIG. 4 is a flow chart of a voice control method of a vacuum cleaner in accordance with the present invention.

As shown in FIG. 4, a voice control method of the vacuum cleaner includes a voice control request recognizing step (ST11) of detecting a sense signal to provide a voice recognition environment; a voice command standby mode step (ST13) of temporarily stopping driving of the motor in response to the detected sense signal and waiting for a voice command of a user; a voice command detecting step (ST15) of detecting a voice command of the user; a voice command control step (ST17) of outputting a voice command control signal from a voice command set according to the detected voice command; and a communication channel connecting step (ST19) of receiving the voice command control signal and outputting the voice command control signal to a body of the vacuum cleaner through a wired or wireless communication unit.

In the step (ST13) for the voice command standby mode, after the driving of the motor is temporarily stopped, and then, when a certain time elapses, the motor driving is resumed to perform a certain operation until a new sense signal is inputted.

Thereafter, the vacuum cleaner sequentially performs a series of operations previously set in the voice command set until a new sensing is inputted.

As so far described, the voice control apparatus and method of a vacuum cleaner of the present invention have the following advantages.

That is, by providing a voice recognizable environment, the vacuum cleaner can be effectively controlled through a user's voice command even in an environment with a strong noise.

In addition, since a high performance microcomputer is not necessary to drive the voice recognition algorithm, a cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

The present disclosure relates to subject matter contained in priority Korean Patent Application No. 2002-45865, filed on Aug. 2, 2002, the contents of which is herein expressly incorporated by reference in its entirety.

What is claimed is:

1. A voice control method of a vacuum cleaner, comprising:
   receiving a sound through a microphone and detecting a sense signal of a user's voice corresponding to a previously recognized voice from the received sound, during an operation of the vacuum cleaner;
   temporarily stopping driving of a motor of the vacuum cleaner based on the detected sense signal of the user's voice;
   receiving a user's voice command that controls the vacuum cleaner after temporarily stopping driving of the motor; and
   controlling a function and a mode of the vacuum cleaner based on a voice command control signal corresponding to the user's voice command.

2. The method of claim 1, wherein the sense signal is a voice signal of a user inputted through a microphone.

3. The method of claim 2, wherein the sense signal is a voice signal obtained by receiving an ambient sound through the microphone and separately extracting a voice signal, or by selectively canceling only a noise from the ambience.

4. The method of claim 2, wherein the sense signal is a voice signal corresponding to a nickname previously recognized by a detector in order to heighten a voice recognition rate.

5. The method of claim 4, wherein the voice signal is detected by previously learning a voice source of a user for a predetermined time and comparing the stored value and the sense signal value for voice recognition.

6. The method of claim 1, wherein the sense signal includes a contact signal detected through a tactile sensor which generates a signal by human body's contact thereto.

7. The method of claim 6, wherein the tactile sensor is attached at a certain portion of the body of a vacuum cleaner or at a certain portion of a docking station separated from the body of the vacuum cleaner.

8. The method of claim 1, wherein the sense signal includes an infrared signal provided from an infrared remote controller and detected through an infrared remote controller receiving unit.

9. The method of claim 1, wherein after the driving of the motor is temporarily stopped, and then, when a certain time elapses, the motor driving is resumed to perform a certain operation until a new sense signal is inputted.

10. The method of claim 1, wherein the voice command control signal is outputted from a voice command set previously set according to a voice command instructed by a user.

11. The method of claim 10, wherein a user's voice command is learned previously for a predetermined time and stored in the voice command set, and then the stored voice command value and a voice command value instructed by the user are compared to output the voice command control signal.

12. The method of claim 10, wherein, as for the voice command control signal, after a user's voice command is discriminated by a voice recognizer, each voice command is coded to output a data frame, and the coded data frame is outputted as a decoded signal.

13. The method of claim 10, wherein the voice command set includes a control sentence for instructing operation, movement, rotation and stoppage of the motor; a numerical sound for controlling a strong, medium and weak driving force of the motor, and a command sentence for controlling a display window showing an operation state of the vacuum cleaner.

14. The method of claim 10, wherein the vacuum cleaner sequentially performs a series of operations previously set in the voice command set until a sense signal is newly inputted.

15. The method of claim 1, wherein the voice command control signal is outputted to the vacuum cleaner through a communication channel in order to control a function and a mode of the vacuum cleaner.

16. The method of claim 15, wherein the communication channel is connected through a wired or wireless communication unit.

17. The method of claim 1, wherein the vacuum cleaner is operated in one of a fully automatic mode, in a remote control mode and in a manual control mode.

18. A voice control apparatus of a vacuum cleaner comprising:
   a sense signal detector that detects a sense signal of a user's voice corresponding to a previously recognized voice from the received sound, during an operation of the vacuum cleaner;
   a voice command recognizing unit that temporarily stops a driving of a motor of the vacuum cleaner upon receiving the detected sense signal and, at the same time, outputs a voice command control signal previously set in a voice command set corresponding to a voice command instructed by the user; and
   a driving command controller that controls a function and a mode of the vacuum cleaner upon receiving the voice command control signal.

19. The apparatus of claim 18 further comprising:
a wired or wireless communication channel that receives the voice command control signal and outputs a voice command control signal to the vacuum cleaner.

20. The apparatus of claim 18, wherein the sense signal is a voice signal separately extracted from an ambient sound through a microphone after sensing the ambient sound, or a voice signal detected after selectively canceling only a noise from the ambient sound, and a voice signal corresponding to a nickname previously recognized by a detector in order to heighten a voice recognition rate.

21. The apparatus of claim 18, wherein the sense signal is a contact signal detected by a tactile sensor attached at a certain portion of the body of the vacuum cleaner or at a certain portion of a docking station separated from the body of the vacuum cleaner.

22. The apparatus of claim 18, wherein the sense signal is an infrared signal provided from an infrared remote controller and detected through an infrared remote controller receiving unit.

23. The apparatus of claim 18, wherein the voice command recognizing unit comprises:
a voice recognizer that discriminates a voice command given by a user; an encoder unit that codes each voice command as discriminated and outputs the coded voice command ; and a decoder unit that decodes a data frame coded by the encoder unit and outputs the decoded data.

24. The apparatus of claim 18, wherein a user's voice command is learned previously for a predetermined time and stored in the voice command set, and then the stored voice command value and a voice command value instructed by the user are compared to output the voice command control signal.

25. The method of claim 18, wherein the voice command set includes a control sentence for instructing operation, movement, rotation and stoppage of the motor; a numerical sound for controlling a strong, medium and weak driving force of the motor, and a command sentence for controlling a display window showing an operation state of the vacuum cleaner.

26. The method of claim 18, wherein a series of operations previously set in the voice command set are sequentially performed until a fresh sense signal provided for voice recognition is inputted from the user.

* * * * *